US009457775B2

(12) United States Patent
Goers et al.

(10) Patent No.: US 9,457,775 B2
(45) Date of Patent: Oct. 4, 2016

(54) BRAKE SYSTEM CONTROL UNIT AND SPEED SENSOR ARRANGEMENT

(71) Applicant: WABCO GmbH, Hannover (DE)

(72) Inventors: Andreas Goers, Pattensen (DE); Marco Michel, Hannover (DE); Otmar Struwe, Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/655,397

(22) PCT Filed: Oct. 31, 2013

(86) PCT No.: PCT/EP2013/003282
§ 371 (c)(1),
(2) Date: Jun. 25, 2015

(87) PCT Pub. No.: WO2014/108146
PCT Pub. Date: Jul. 17, 2014

(65) Prior Publication Data
US 2015/0367821 A1 Dec. 24, 2015

(30) Foreign Application Priority Data
Jan. 8, 2013 (DE) .................... 10 2013 000 205

(51) Int. Cl.
*B60T 8/171* (2006.01)
*B60T 8/88* (2006.01)

(52) U.S. Cl.
CPC .............. *B60T 8/171* (2013.01); *B60T 8/885* (2013.01); *B60T 2270/413* (2013.01); *B60T 2270/416* (2013.01)

(58) Field of Classification Search
CPC .......... B60T 8/00; G01M 17/00; G01P 15/00
See application file for complete search history.

(56) References Cited

U.S. PATENT DOCUMENTS 5,140,260 A * 8/1992 Braschel ................. B60T 8/172
324/160
6,109,102 A * 8/2000 Schneider ............... B60T 8/171
73/488

(Continued)

FOREIGN PATENT DOCUMENTS

DE     38 12 904 A1    9/1989
DE    199 12 877 A1   10/1999

(Continued)

*Primary Examiner* — Thomas Tarcza
*Assistant Examiner* — Alex C Dunn
(74) *Attorney, Agent, or Firm* — Warner Norcross & Judd LLP (57) ABSTRACT

A control unit of a vehicle brake system has a receive circuit for tapping and processing a digital signal provided by an active speed sensor for speed measurement on a vehicle wheel. The signal includes information concerning the speed of a pole wheel, which is arranged in front of the sensor, spaced therefrom by an air gap, and which rotates along with the wheel. The signal also includes an actual air gap value digitized in stages and comprising several bits. The control unit also has a comparator circuit for comparing the actual air gap value to a reference air gap value and for determining whether the actual air gap value exceeds the reference value by more than a defined tolerance value. An information circuit of the control circuit generates early warning information when the comparator circuit determines that the actual air gap value exceeds the reference value by more than the tolerance value.

20 Claims, 3 Drawing Sheets

(56) References Cited

U.S. PATENT DOCUMENTS

| | | | |
|---|---|---|---|
| 7,099,795 B1 * | 8/2006 | Gerstenmeier | B60T 8/171 702/148 |
| 8,864,244 B2 * | 10/2014 | Leiber | B60T 8/00 188/157 |
| 9,076,272 B2 * | 7/2015 | Hammerschmidt | B60T 8/171 |
| 2004/0024504 A1 * | 2/2004 | Salib | B60G 17/0162 701/38 |
| 2004/0100251 A1 * | 5/2004 | Lohberg | G01D 5/24404 324/166 |
| 2008/0303513 A1 * | 12/2008 | Turner | G01P 3/488 324/160 |
| 2010/0281975 A1 * | 11/2010 | LeMerise | G01P 3/488 73/494 |

FOREIGN PATENT DOCUMENTS

| | | |
|---|---|---|
| DE | 199 11 774 A1 | 12/1999 |
| DE | 102 03 483 A1 | 11/2002 |
| DE | 10 2007 056 340 A1 | 5/2009 |
| GB | 2 313 746 A | 12/1997 |
| WO | WO 2007/057429 A1 | 5/2007 |
| WO | WO 2008/022968 A2 | 2/2008 |

* cited by examiner

BRAKE SYSTEM CONTROL UNIT AND SPEED SENSOR ARRANGEMENT

FIELD OF THE INVENTION

The present invention generally relates to a control unit for controlling a vehicle brake system.

BACKGROUND OF THE INVENTION

It is known to arrange a passive sensor in a drilled hole or in another securing opening in the region of a vehicle wheel in a clamping fashion in order to perform rotational speed sensing. Analog signals are transmitted from the passive rotational speed sensor to a control unit, which can additionally determine the respective air gap between the passive sensor and a pole wheel from these analog signals. The passive sensor can be displaced axially in the drilled hole and can therefore, under certain circumstances, assume an unacceptably large distance from the pole wheel, which can, however, be detected at the control unit.

Furthermore, if is known to arrange or to secure an active rotational speed sensor in an immovable fashion in the region of the pole wheel. The active rotational speed sensor therefore cannot be displaced unacceptably. When there is such an active rotational speed sensor, simple monitoring of the air gap is carried out by means of the rotational speed sensor itself. DE 199 11 774 A1 discloses detecting changes in the air gap by means of the rotational speed sensor in order to generate a corresponding status signal in good time before a possible sensor signal loss. However, in this context, only a binary distinction is made at the rotational speed sensor between an acceptable and an unacceptable air gap.

Furthermore, for other purposes, an analog signal, which is a measure of the air gap, is digitized with 3-bit coding and provided to a control unit. According to DE 102 03 483 A1, the word size with which, for example, the magnetic air gap field strength can be transmitted from the rotational speed sensor to the control unit can be 4 bits. The control unit can track the chronological profile of the air gap field strength with increased resolution and, if appropriate, evaluate it further. In particular, this procedure aims, according to DE 102 03 483 A1, to sense dynamic changes in the air gap and use them to determine driving states in a brake control system and/or vehicle dynamics control system. Furthermore, the observation of the current air gap according to DE 102 03 483 A1 can also be used as a measure of the lateral acceleration acting on the wheel or the wheel bearing temperature. Therefore, only changes in the air gap that are caused by the position of the pole wheel are evaluated at the control unit. On the other hand, the correct position of the rotational speed sensor is further monitored in a simple way by means of the speed sensor.

SUMMARY OF THE INVENTION

Generally speaking, it is an object of the present invention to improve the monitoring of an air gap between an active rotational speed sensor and a pole wheel or encoder, which is arranged on a wheel of the vehicle and rotates together with the wheel, when sensing rotational speed by means of the active rotational speed sensor. The rotational speed of the wheel can be inferred from the rotational speed of the pole wheel.

The control unit has a receiver circuit for tapping and processing the digital signal that is provided by the active rotational speed sensor for the rotational speed measurement at the wheel of the vehicle. This digital signal contains rotational speed information about the rotational speed of the pole wheel, which is arranged in front of the rotational speed sensor, spaced therefrom by an air gap, and which rotates along with the wheel. Furthermore, this digital signal comprises an actual air gap value that is digitized in a plurality of stages, comprises a plurality of bits and is a measure of the current air gap between the pole wheel and the rotational speed sensor. The actual air gap value can be directly a distance value but can alternatively also be another value, for example a field strength value, from which the air gap can be determined. At any rate, the actual air gap value is a measure of the current air gap between the pole wheel and the rotational speed sensor. The receiver circuit is also preferably designed to determine the rotational speed or the rotational frequency of the pole wheel from the rotational speed information.

Furthermore, the control unit has a comparator circuit designed to compare the actual air gap value with a setpoint air gap value. In particular, a computing device of the control unit can be designed such that it includes this comparator circuit and, if appropriate, further circuits indicated below. The comparator circuit is designed to determine whether the actual air gap value exceeds the setpoint air gap value by more than a defined tolerance value. Furthermore, the control unit has an information circuit for generating and providing pre-warning information if the comparator circuit has determined that the actual air gap value exceeds the setpoint air gap value by more than the tolerance value. In particular, the pre-warning information is generated and provided in response to a determination that the actual air gap value exceeds the setpoint air gap value by more than the tolerance value. According to a preferred embodiment, the defined tolerance value is 0, with the result that any known deviation of the actual air gap value from the setpoint air gap value generates pre-warning information. According to an alternative embodiment, the tolerance value is, however, a value other than 0, with the result that small deviations of the actual air gap value from the setpoint air gap value are tolerated without pre-warning information being generated.

Embodiments of the present invention permit multi-stage monitoring of the correct position of the rotational speed sensor. The control unit already detects slipping of the rotational speed sensor when the rotational speed sensor is still supplying correct values. For this reason, slipping of the rotational speed sensor can be detected and eliminated early. Inventive embodiments therefore permit an active rotational speed sensor to be clamped similarly or analogously to the known clamping of a passive or inductive rotational speed sensor. If the active rotational speed sensor shifts, for example, as a result of vibrations, this is signaled early and can be eliminated in a workshop, for example, by simply reprinting the rotational speed sensor. A complete failure of the rotational speed sensor can therefore be avoided in most cases, which increases safety during operation of the vehicle.

It should be appreciated that the control unit according to embodiments of the present invention can have application in a vehicle brake system, including in a rotational speed sensor arrangement. A method according to an embodiment of the present invention for sensing the rotational speed is effected by and corresponds to the purpose or the configuration of the control unit or of the brake system or of the rotational speed sensor arrangement. The inventive advantages thus correspond to the inventive advantages of the control unit.

According to an embodiment, the comparator circuit of the control unit is designed to compare the actual air gap value with a limiting air gap value. The comparator circuit can determine whether the actual air gap value reaches or exceeds the limiting air gap value. The limiting air gap value is a critical value, at which data or information from the corresponding rotational speed sensor should no longer be used. According to this embodiment, the information circuit is therefore designed to generate and provide fault information if the comparator circuit has determined that the actual air gap value reaches or exceeds the limiting air gap value. In particular, the information circuit is designed to generate and provide the fault information if the comparator circuit has determined that the actual air gap value exceeds the setpoint air gap value by more than the tolerance value and reaches or exceeds the limiting air gap value.

The comparator circuit preferably does not perform the comparison of the actual air gap value with the limiting air gap value until it has been detected that the actual air gap value exceeds the setpoint air gap value by more than the tolerance value or differs from the actual air gap value. A differentiation can be made between still tolerable and no longer tolerable deviations of the actual air gap value from the setpoint air gap value i.e., to generate pre-warning information and/or fault information as a function of the determined air gap between the rotational speed sensor and the pole wheel.

According to one variant of this embodiment, the limiting air gap value is set as a function of the setpoint air gap value, and therefore given by means of a set differential value similarly to the defined tolerance value. According to an alternative variant, the limiting air gap value is set independently of the setpoint air gap value.

According to another embodiment, the information circuit is designed to generate and provide installation information. This installation information comprises the information as to whether the installation of the rotational speed sensor has been determined as correct or incorrect. According to this embodiment, the comparator circuit is therefore designed to detect, by means of the comparison of the actual air gap value with a predefined air gap value or with an interval between predefined air gap values, the installation of the rotational speed sensor as correct if the actual air gap value corresponds to the predefined air gap value or is in the interval between the predefined air gap values, and otherwise to detect the installation as incorrect.

According to this embodiment, automatic detection of the correct installation position can be effected by means of the control unit during the fabrication of the vehicle or during or after assembly, for example at the end of the production line. The installation information therefore comprises assessment of the currently determined actual air gap value, which can, however, be contained additionally in the installation information.

According to a further embodiment of the present invention, the information circuit is alternatively or additionally designed to generate and provide further installation information that contains the actual air gap value. With this embodiment, during or after the fabrication of the vehicle, for example at the end of the production line, the digital measured value of the air gap, which has been determined and provided at the control unit, or the actual air gap value can be read out by means of a diagnostic device and, for example, displayed, with the result that it is possible to detect manually or by means of software on the diagnostic unit whether the rotational speed sensor is correctly installed.

According to another embodiment, the control unit has an initialization circuit for setting the setpoint air gap value to the current actual air gap value, in particular in response to installation of the rotational speed sensor, which has been detected as correct, and a memory circuit for storing the setpoint air gap value. With the initialization circuit, during fabrication or in response to a diagnosis at the end of the production line, the setpoint air gap value can be set, and with the memory circuit, can be stored, in particular, in a data memory. The comparator circuit therefore subsequently performs comparisons relative to the setpoint air gap value, which has been detected as correct. According to an alternative embodiment, the setpoint air gap value is set to a predefined value. This can be appropriate, in particular, when the defined tolerance value is a value other than zero, and during fabrication the only check has been whether the actual air gap value is in an interval between predefined air gap values.

A standardized data protocol, for example the AK protocol, is preferably used to transmit the rotational speed information and the actual air gap value. Rotational speed pulses are transmitted here with a first level, wherein the distance between the rotational speed pulses or the frequency thereof provides conclusive information about the rotational speed or rotational frequency of the pole wheel. After each rotational speed pulse, a data protocol is transmitted with a second level, which is reduced compared to the first level. The data protocol has a first bit sequence with information and a subsequent second bit sequence with additional information. This additional information preferably comprises the actual air gap value. The actual air gap value is preferably transmitted with word sizes of 3 or 4 bits in the digital signal or in the additional information. These 3 or 4 bits are free bits to which specific information can be freely assigned. In contrast, the first bit sequence is defined with the information for compatibility reasons.

In the data protocol, the data or bits, that is, the differentiation between 1 and 0, are defined either by the amplitude of the signal or preferably by the rise or fall in pulse edges. As an alternative to the AK protocol, the data are transmitted encoded in some other way, for example by means of pulse width modulation (PWM).

The receiver circuit is preferably designed to determine the rotational speed from the frequency of the arrival of rotational pulses, which are received with a first level, and to determine the actual air gap value from a data protocol, which is respectively received after a rotational speed pulse with a second level. In addition, the control unit is preferably designed to read out the actual air gap value from 3 or 4 bits in the digital signal.

The rotational speed sensor arrangement according to an embodiment of the present invention has, in addition to the inventive control unit, the active rotational speed sensor and a data interface tor transmitting the digital signal from the active rotational speed sensor to the control unit. The data interface is, for example, a two wire line, which is preferably twisted. The data interface is therefore similar to a data interface with a known passive rotational speed sensor.

According to one embodiment, the active rotational speed sensor has an active sensor element for actively sensing the rotation of the pole wheel, which is arranged in front of the rotational speed sensor, separated therefrom by the air gap, and rotates along with the edge. Furthermore, the active rotational speed sensor preferably has an air gap-detection circuit for determining an analog measured value, which is a measure of the current air gap between the pole wheel and the rotational speed sensor, and for multi-stage digitization of the analog measured value in order to generate the digital actual air gap value, which comprises a plurality of bits. In addition, the active rotational speed sensor has a transmitter circuit for providing the digital signal, which contains rotational speed information about the rotational speed of the pole wheel and the actual air gap value.

According to an embodiment, the rotational speed sensor for measuring the rotational speed is embodied such that it can be clamped, in particular by means of a clamping bushing, in any desired radial orientation and/or in an axially displaceable manner in a securing opening in front of the pole wheel, and/or is clamped in front of the clamping wheel and senses the rotational speed of the pole wheel there. The active sensor element is preferably embodied such that the active rotational speed sensor automatically detects its radial orientation. The active rotational speed sensor can therefore be clamped in the securing opening in a way that is analogous to a known inductive or passive rotational speed sensor.

Furthermore, according to an embodiment, the rotational speed sensor arrangement is embodied such that the rotational speed sensor can be supplied with electrical energy via the data interface. There is therefore no need to provide any additional line for supplying electrical energy beyond the data line, in particular the twisted two-wire line.

A brake system according to an embodiment of the present invention is, for example, a pneumatic brake system with brake cylinders that can be activated pneumatically in order to brake the wheels of the vehicle. The rotational speed information is used, for example, for automatic brake interventions in an anti-lock brake function or in an electronic stability program.

A vehicle according to an embodiment of the present invention, is, in particular, a motor vehicle with an engine. In addition, the vehicle is preferably a utility vehicle that can carry or tow a load. The vehicle has wheels that can be braked by means of a brake system, which can be the brake system according to an embodiment of the present invention. As an alternative to the brake system, the vehicle has the inventive control unit or the inventive rotational speed sensor arrangement.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below on the basis of an exemplary embodiment illustrated in the accompanying drawings, in which.

DETAILED DESCRIPTION OF THE PREFERRED EMBODIMENTS

Figure 1:
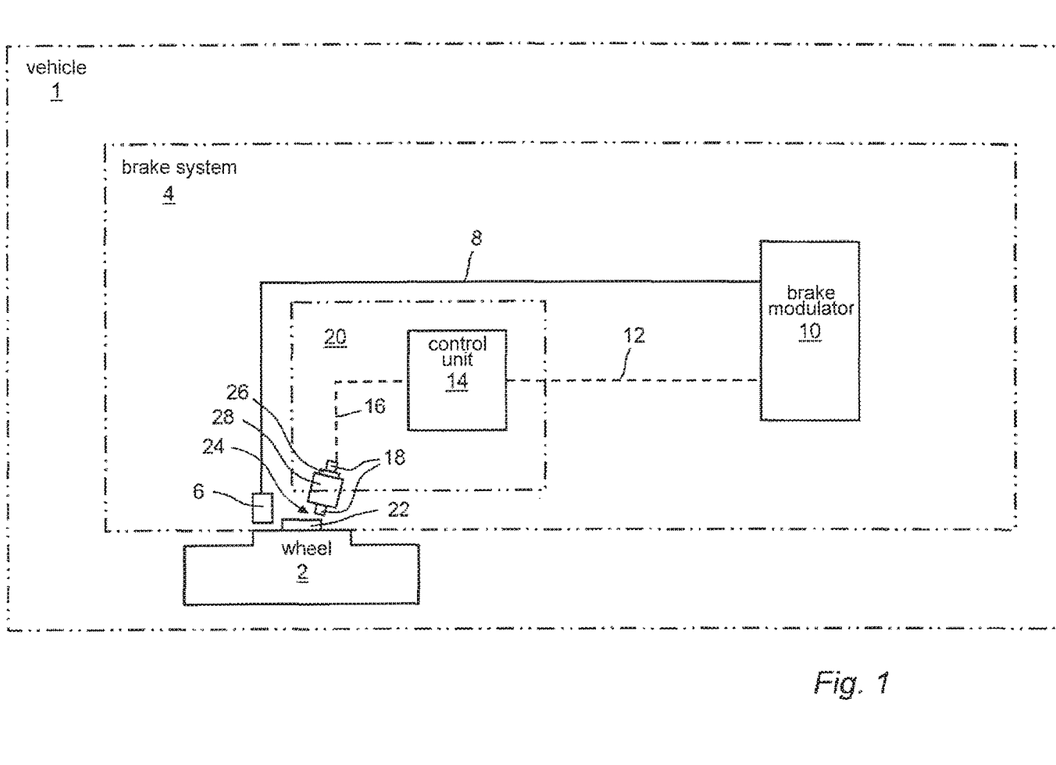
FIG. 1 is a schematic diagram of a vehicle, having a brake system that has a sensor arrangement with a control unit according to an exemplary embodiment of the present invention.

FIG. 1 is a simplified box illustration of a vehicle 1, which is preferably a motor vehicle embodied as a utility vehicle. The vehicle 1 has a wheel 2 as well as further wheels and components. In particular, the vehicle 1 has, for example, an internal combustion engine for driving the wheel 2 and/or the further wheels and a brake system 4 whose system boundary is shown in FIG. 1.

By means of the brake system 4, the vehicle 1 can be braked or arrested. For this purpose, a brake cylinder 6 is arranged on the wheel 2. The brake cylinder can be activated pneumatically via a compressed air line 8. The brake cylinder can also be activated hydraulically by a brake modulator 10. The brake modulator 10 is activated by a control unit 14 via an electric control line 12. The control unit 14 preferably performs the actuation of the brake modulator 10 as a function of an electric brake request signal, which is generated directly or indirectly by the activation of a brake pedal and provided to the control unit 14. In addition, various sensor signals, for example of a sensed pressure in the compressed air line 8, can be provided to the brake modulator 10. The control unit 14 is connected to a rotational speed sensor 28 via a data interface 16, which is preferably embodied as a twisted two-wire line. The control unit 14, the data interface 16 and the rotational speed sensor 18 form, if appropriate together with further components, a sensor arrangement 20.

The rotational speed sensor 18 is arranged in the region of the wheel 2 in front of a pole wheel 22, which rotates along with the wheel 2, but spaced apart from the pole wheel 22 by an air gap 24. The pole wheel 22 is, for example, a steel gear wheel or a wheel with a permanent-magnetic structure, with the result that a signal voltage can be generated in the rotational speed sensor 18.

The rotational speed sensor 18 is clamped in any desired radial orientation and in an axially displaceable fashion counter to a clamping force by means of a clamping bushing 26 in a securing opening 28, which is provided by a securing device or by means of a drilled hole. For the mounting of the rotational speed sensor 18, it is therefore sufficient to insert the clamping bushing 26 and subsequently the rotational speed sensor 18 into the securing opening 28.

Rotational speed pulses and further data are transmitted to the control unit 14 via the data interface 16. In addition, the rotational speed sensor 18 is supplied with electrical energy by the control unit 14 via the same data interface 16. Corresponding arrangements can also be provided for the further wheels of the vehicle 1.

Figure 2:
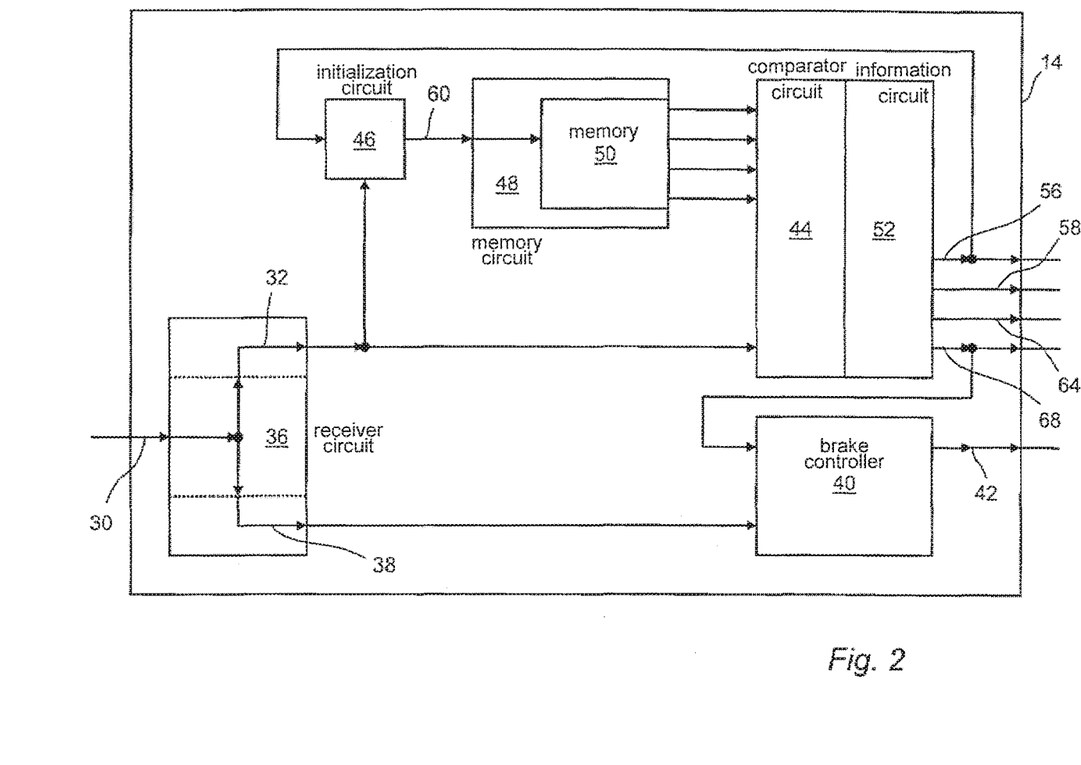
FIG. 2 is a block circuit diagram of the control unit of the exemplary embodiment according to FIG. 1 with signal paths.

FIG. 2 is a block circuit diagram of the control unit 14 of the exemplary embodiment according to FIG. 1 showing internal signal paths between devices of the control unit 14. According to FIG. 1, a digital signal 30 is provided to the control unit 14 via the data interface 16. The digital signal 30 contains an actual air gap value 32, which is generated by means of the rotational speed sensor 18 according to FIG. 1 and is a measure of the air gap 24. In addition, the digital signal 30 contains rotational speed information 34. A receiver circuit 36 of the control unit 14 is configured to determine, from the rotational speed information 34 in the digital signal 30, a rotational speed value 38 or the rotational speed of the pole wheel 22 and therefore that of the wheel 2, and provide it to a brake controller 40, which generates brake control signals 42, if appropriate by taking into account the rotational speed value 38, and can provide them to the brake modulator 10 via the electric control line 12 according to FIG. 1.

The receiver circuit 36 is also configured to extract the actual air gap value 32 from the digital signal 30 and to provide it both to a comparator circuit 44 of the control unit 14 and to an initialization circuit 46 of the control unit 14.

Furthermore, the control unit 14 has a memory circuit 48 with a memory 50 and an information circuit 52. The memory 50 is a data memory in which various predefined comparison values are stored and in which corresponding values can be stored by means of the memory circuit 48. In the memory 50, a predefined air gap value 54 is stored. The air gap value 54 is read out from the memory 50 by the comparator circuit 44 and compared with the actual air gap value 32 in order to check the correct position of the rotational speed sensor 18 in front of the pole wheel 22 after fabrication and before delivery of the vehicle 1. In particular, an interval between predefined air gap values 54 is read out of the memory 50 by means of the comparator circuit 44. If the actual air gap value 32 is within this interval, the installation position of the rotational speed sensor is detected as correct, with the result that the information circuit 52 generates installation information 56 according to which the position of the rotational speed sensor 18 has been detected as correct. This installation information 56 is also provided to the initialization circuit 46, which, in response thereto, writes the actual air gap value 32 as a new setpoint air gap value 60 to the memory 50 by means of the memory circuit 48. In addition, the measured air gap 24 is provided in the installation information 56 and/or in additionally provided further installation information 58.

During normal operation of the vehicle 1 or of the brake system 4 or of the control unit 14, the setpoint air gap value 60 is used by the comparator circuit 44 for comparison with the actual air gap value 32 in order to permit, in the event of a deviation above a tolerance value 62, which is also read out from the memory 50, the information circuit 52 to provide pre-warning information 64 if the comparator circuit 44 has determined that the actual air gap value 32 exceeds the setpoint air gap value 60 by more than the tolerance value 62. As an alternative to the exemplary embodiment shown, the tolerance value 62 is not stored in the memory 50. In particular, if the value 0 is stored as a tolerance value 62, it is sufficient to determine a deviation of the actual air gap value from the setpoint air gap value 60 in order to generate the pre-warning information 64 in response thereto.

In response to the provision of the pre-warning information 64, for example, a warning light in the driver's cab of the vehicle 1 is actuated in order to signal to a driver of the vehicle 1 that the vehicle should be taken to a mechanic. In the workshop, the rotational speed sensor 18 can be pressed again into a suitable position, which is checked, for example, by means of the first installation information 58, which can preferably be read out by a diagnostic unit. The initialization circuit 46 preferably sets the setpoint air gap value 60 either automatically or subsequently by means of manual activation to the actual air gap value 32 at that time.

If the comparison of the actual air gap value 32 with the setpoint air gap value 60 has, however, produced a deviation greater than a limiting air gap value 66, which is read out from the memory 50, the information circuit 52 generates, alternatively or additionally to the pre-warning information 64, fault information 68, which is provided for actuating a warning light and the brake controller 40. The brake controller 40 takes into account this fault information 68 during the decision as to whether the rotational speed value 38 can still be taken into account, or, in response to the fault information 68, subsequently no longer takes into account the rotational speed value 38.

Figure 3:
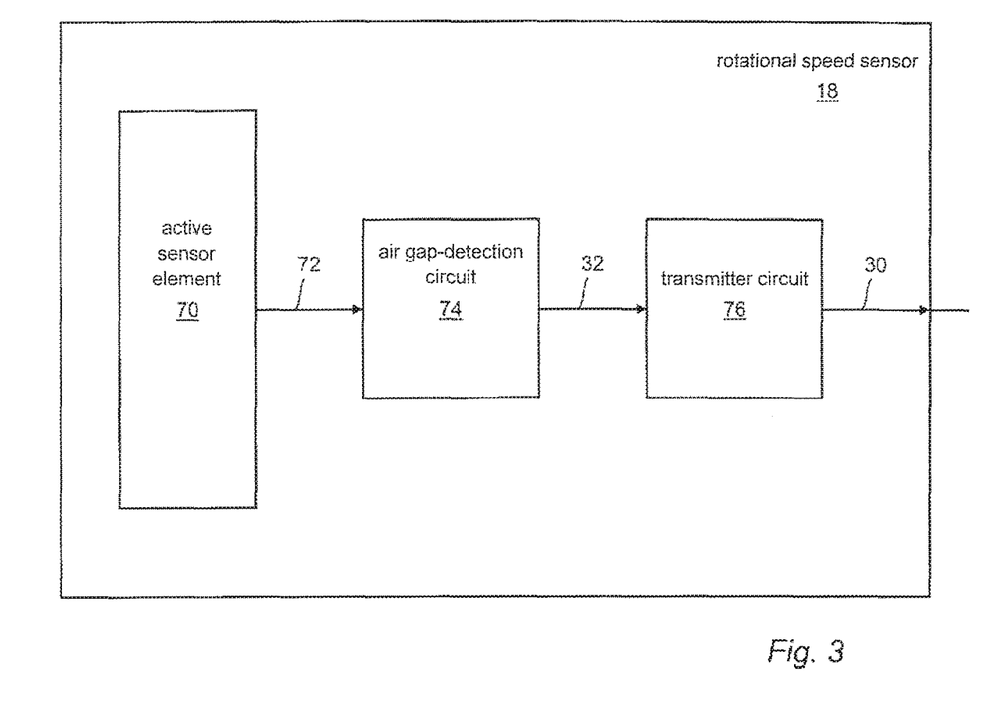
FIG. 3 is a block circuit diagram of the rotational speed sensor of the exemplary embodiment according to FIG. 1 with signal paths.

FIG. 3 shows the rotational speed sensor 18 of the exemplary embodiment according to FIG. 1 with its devices as a block circuit diagram in which internal signal paths are illustrated.

The rotational speed sensor 18 is an active rotational speed sensor, which has an active sensor element 70 with passive pickups. In order to sense the position or rotation of the pole wheel 22, the active sensor element 70 requires an auxiliary voltage, which is provided indirectly via the data interface 16 according to FIG. 1. The active sensor element 70 comprises, for example, a Hall element or a magneto-resistive bridge.

The active sensor element 70 provides, in particular repeatedly, an analog measured value 72, which is fed to an air gap-detection circuit 74 of the rotational speed sensor 18. Alternatively, or additionally, the active sensor element 70 provides digital measured values directly.

The air gap-detection circuit 74 determines the actual air gap value 32, preferably with a word size of 3 or 4 bits, from the analog measured value 72 or by means of multi-stage digitization. The actual air gap value 32 is provided in the digital signal 30 by means of a transmitter circuit 76 of the rotational speed sensor 18, and the actual air gap value 32 can be fed to the control unit 14 via the data interface 16.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that as a matter of language, might be said to fall there-between.

What is claimed is:

1. A control unit for controlling a brake system of a vehicle, the control unit comprising a receiver circuit configured to process, using at least one data processor, a digital signal from an active rotational speed sensor, the digital signal including (i) rotational speed information of a pole wheel disposed in front of the active rotational speed sensor and spaced from the active rotational speed sensor by an air gap, the pole wheel being configured to rotate with a wheel of the vehicle, and (ii) an actual air gap value representing the air gap between the pole wheel and the active rotational speed sensor, the actual air gap value being digitized in a plurality of stages and including a plurality of bits; a comparator circuit configured to compare, using at least one data processor, the actual air gap value with a setpoint air gap value and to determine whether the actual air gap value exceeds the setpoint air gap value by more than a tolerance value; and an information circuit configured to generate, using at least one data processor, pre-warning information when the comparator circuit determines that the actual air gap value exceeds the setpoint air gap value by more than the tolerance value, and output the pre-warning information to at least one of a brake controller and a warning light of the vehicle.

2. The control unit as claimed in claim 1, wherein the comparator circuit is configured to compare the actual air gap value with a limiting air gap value and to determine whether the actual air gap value exceeds the limiting air gap value, and wherein the information circuit is configured to generate fault information when the comparator circuit determines that the actual air gap value exceeds the setpoint air gap value by more than the tolerance value and one of reaches and exceeds the limiting air gap value.

3. The control unit as claimed in claim 1, wherein the comparator circuit is configured to compare the actual air gap value with one of a predefined air gap value and an interval between predefined air gap values and to determine that installation of the active rotational speed sensor is correct when the actual air gap value one of corresponds to the predefined air gap value and is in the interval between the predefined air gap values, and wherein the information circuit is configured to generate information as to whether the installation of the active rotational speed sensor is correct or not.

4. The control unit as claimed in claim 3, further comprising an initialization circuit configured to set the setpoint air gap value to the actual air gap value when the installation of the active rotational speed sensor is correct; and a memory circuit for storing the setpoint air gap value.

5. A rotational speed sensor system, comprising:
   a) an active rotational speed sensor configured to (i) actively sense rotation of a pole wheel disposed in front of the active rotational speed sensor and spaced from the active rotational speed sensor by an air gap, and (ii) generate a digital signal including rotational speed information of the pole wheel, and an actual air gap value representing the air gap between the pole wheel and the active rotational speed sensor;
   b) the control unit as claimed in claim 1; and
   c) a data interface configured to transmit the digital signal from the active rotational speed sensor to the control unit.

6. The rotational speed sensor system as claimed in claim 5, wherein the active rotational speed sensor includes:
   a) an active sensor element configured to actively sense the rotation of the pole wheel;
   b) an air gap-detection circuit configured to determine an analog measured value representing the air gap between the pole wheel and the active rotational speed sensor and to generate the actual air gap value by multi-stage digitization of the analog measured value; and
   c) a transmitter circuit to provide the digital signal.

7. The rotational speed sensor system as claimed in claim 5, wherein the active rotational speed sensor is configured to be clamped in a securing opening in front of the pole wheel in at least one of a radial orientation and an axially displaceable orientation.

8. A vehicle brake system, comprising the control unit as claimed in claim 1.

9. A vehicle, comprising the control unit as claimed in claim 1.

10. A method for sensing rotational speed at a wheel of a vehicle, the method comprising:
    a) using an active rotational speed sensor to sense rotation of a pole wheel disposed in front of the active rotational speed sensor and spaced from the active rotational speed sensor by an air gap;
    b) by the active rotational speed sensor, providing a digital signal via a data interface to a control unit, the digital signal including rotational speed information of the pole wheel and an actual air gap value representing the air gap between the pole wheel and the active rotational speed sensor, the actual air gap value being digitized in a plurality of stages and including a plurality of bits;
    c) using a receiver circuit of the control unit to process, by at least one data processor, the digital signal;
    d) monitoring the air gap using a comparator circuit of the control unit configured to compare, by at least one data processor, the actual air gap value with a setpoint air gap value and to determine whether the actual air gap value exceeds the setpoint air gap value by more than a tolerance value; and
    e) using an information circuit of the control unit to generate, by at least one data processor, pre-warning information when the comparator circuit determines that the actual air gap value exceeds the setpoint air gap value by more than the tolerance value, and output the pre-warning information to at least one of a brake controller and a warning light of the vehicle.

11. The method as claimed in claim 10, further comprising using the comparator circuit to compare the actual air gap value with a limiting air gap value and to determine whether the actual air gap value one of reaches and exceeds the limiting air gap value; and using the information circuit to generate fault information when the comparator circuit determines that the actual air gap value exceeds the setpoint air gap value by more than the tolerance value and one of reaches and exceeds the limiting air gap value.

12. The method as claimed in claim 10, further comprising using the comparator circuit to compare the actual air gap value with one of a predefined air gap value and an interval between predefined air gap values and to determine that installation of the active rotational speed sensor is correct when the actual air gap value one of corresponds to the predefined air gap value and is in the interval between the predefined air gap values; and using the information circuit to generate information as to whether the installation of the active rotational speed sensor is correct or not.

13. The method as claimed in claims 10 to 12, further comprising using an initialization circuit of the control unit to set the setpoint air gap value to the actual air gap value when the installation of the active rotational speed sensor is correct; and using a memory circuit of the control unit to store the setpoint air gap value.

14. The method as claimed in claim 10, further comprising using an active sensor element of the active rotational speed sensor to actively sense rotation of the pole wheel; using an air gap detection circuit of the active rotational speed sensor to determine an analog measured value representing the current air gap between the pole wheel and the active rotational speed sensor and to generate the actual air gap value by multi-stage digitization of the analog measured value; and using a transmitter circuit of the rotational speed sensor to provide the digital signal.

15. The method as claimed in claim 10, further comprising clamping the rotational speed sensor in a securing opening in front of the pole wheel in at least one of a radial orientation and an axially displaceable orientation.

16. The rotational speed sensor system as claimed in claim 7, wherein the active rotational speed sensor is clamped in the securing opening in front of the pole wheel via a clamping bushing.

17. A rotational speed sensor system, comprising the control unit as claimed in claim 1.

18. A vehicle brake system, comprising a rotational speed sensor system, the rotational speed sensor system including:
    a) an active rotational speed sensor configured to (i) actively sense rotation of a pole wheel disposed in front of the active rotational speed sensor and spaced from the active rotational speed sensor by an air gap and (ii) generate a digital signal including rotational speed information of the pole wheel and an actual air gap value representing the air gap between the pole wheel and the active rotational speed sensor, the actual air gap value being digitized in a plurality of stages and including a plurality of bits, b) a control unit including a receiver circuit configured to process the digital signal, a comparator circuit configured to compare the actual air gap value with a setpoint air gap value and to determine whether the actual air gap value exceeds the setpoint air gap value by more than a tolerance value, and an information circuit configured to generate pre-warning information when the comparator circuit determines that the actual air gap value exceeds the setpoint air gap value by more than the tolerance value, and output the pre-warning information to at least one of a brake controller and a warning light of a vehicle, and c) a data interface configured to transmit the digital signal from the active rotational speed sensor to the control unit.

19. A vehicle, comprising the vehicle brake system as claimed in claim 18.

20. The method as claimed in claim 15, wherein the clamping is effected via a clamping bushing.

* * * * *

UNITED STATES PATENT AND TRADEMARK OFFICE
CERTIFICATE OF CORRECTION

| | | |
|---|---|---|
| PATENT NO. | : 9,457,775 B2 | Page 1 of 1 |
| APPLICATION NO. | : 14/655397 | |
| DATED | : October 4, 2016 | |
| INVENTOR(S) | : Andreas Goers, Marco Michel and Otmar Struwe | |

It is certified that error appears in the above-identified patent and that said Letters Patent is hereby corrected as shown below:

In the Claims

Column 10, Claim 13, Line 35:
"claims 10 to 12,"

Should read:
--claim 10,--

Signed and Sealed this
Twenty-first Day of February, 2017

Michelle K. Lee
*Director of the United States Patent and Trademark Office*